United States Patent
Asokan et al.

(10) Patent No.: US 6,959,009 B2
(45) Date of Patent: Oct. 25, 2005

(54) ADDRESS ACQUISITION

(75) Inventors: Nadarajah Asokan, Espoo (FI); Jonne Soininen, Helsinki (FI); Jaakko Rajaniemi, Helsinki (FI); Lassi Hippeläinen, Helsinki (FI); Tuija Hurtta, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 784 days.

(21) Appl. No.: 09/765,190

(22) Filed: Jan. 18, 2001

(65) Prior Publication Data

US 2001/0017856 A1 Aug. 30, 2001

(30) Foreign Application Priority Data

Jan. 20, 2000 (FI) .............................................. 20000121

(51) Int. Cl.$^7$ ................................................. H04J 3/24
(52) U.S. Cl. ......................... 370/475; 370/465; 709/219
(58) Field of Search ................................. 370/389, 392, 370/401, 410, 252, 465, 475; 709/227, 228, 217, 219, 223

(56) References Cited

U.S. PATENT DOCUMENTS

| | | | |
|---|---|---|---|
| 6,208,656 B1 * | 3/2001 | Hrastar et al. ............... | 370/401 |
| 6,240,449 B1 * | 5/2001 | Nadeau ........................ | 709/223 |
| 6,690,679 B1 * | 2/2004 | Turunen et al. .............. | 370/469 |

FOREIGN PATENT DOCUMENTS

| | | |
|---|---|---|
| EP | 0938217 | 8/1999 |
| EP | 0967769 | 12/1999 |
| EP | 0987868 A2 | 3/2000 |
| EP | 0998099 | 5/2000 |
| EP | 1014628 | 6/2000 |
| WO | WO 96/39769 | 12/1996 |
| WO | WO 97/48208 | 12/1997 |
| WO | WO 99/17497 | 4/1999 |
| WO | WO 99/50974 | 10/1999 |
| WO | WO 01/06732 A1 | 1/2001 |

OTHER PUBLICATIONS

"IP Version 6 Over PPP", IETF RFC 2472, 1998.
"IP Version 6 Addressing Architecture", IETF RFC 2373, 1998.
"IPv6 Stateless Address Autoconfiguration", IETF RFC 2462, 1998.

* cited by examiner

*Primary Examiner*—Phirin Sam
(74) *Attorney, Agent, or Firm*—Perman & Green, LLP

(57) ABSTRACT

A method for a mobile station to acquire a IP network address from a gateway in GPRS system. First the mobile station generates a link identifier. Next the mobile requests a network address by sending a link identifier over a wireless to a gateway along with a request for the gateway to check to see if the link identifier is unique. Upon receiving the network address request the gateway checks to see if the link identifier is unique. The gateway responses by either confirming that the network link identifier is unique or by sending a different unique link identifier to the mobile station. The gateway also has the ability to respond by sending a network prefix to the mobile station. Upon receiving the network prefix the mobile station combines the network prefix with the interface identifier to generate a IP network address.

35 Claims, 8 Drawing Sheets

ADDRESS ACQUISITION

FIELD OF THE INVENTION

The invention relates to address acquisition. It is particularly, but not exclusively, related to address acquisition of mobile terminals in a mobile system. In one embodiment, it is related to acquisition of an Internet address in a General Packet Radio Service (GPRS) system.

BACKGROUND OF THE INVENTION

The current communication protocol used in the Internet is called IPv4 (Internet Protocol version 4). In order for a node to be functionally connected to the Internet, it requires an address. The addresses used in IPv4 are 32 bit. The address may be assigned by a server. Some nodes may have static addresses which are stored in the node and so they do not need to be assigned an address by a server. Alternatively, some IPv4 nodes may use a protocol called DHCP (dynamic host configuration protocol) in which a DHCP server assigns predetermined IP addresses.

When an IPv4 node obtains its connectivity via a point-to-point communication channel, it typically uses PPPv4 (PPP version 4). PPPv4 has been standardised to work with 32 bit addresses so that IPv4 and PPPv4 are compatible and addresses can be negotiated between them.

The number of addresses provided by IPv4, that is the number of addresses provided by 32 bits, is limited and another Internet Protocol has been proposed IPv6 (Internet Protocol version 6). This has 128 bit addresses and so provides a much larger number of addresses than IPv4. An IPv6 address typically consists of a 64-bit network prefix (or subnet prefix) followed by a 64-bit interface identifier.

A point-to-point protocol, PPPv6, has been configured to work with IPv6. PPPv6 can work with 64-bit addresses. In one arrangement, an IPv6 node uses PPPv6 to obtain an interface identifier, constructs a link-local address based upon the interface identifier and then uses the link-local address to determine its global IPv6 address by sending a router solicitation and receiving a router advertisement. The router advertisement provides the subnet prefix which is required to complete the global IPv6 address. PPPv6 and IPv6CP protocols are described in "IP version 6 over PPP", IETF RFC 2472 December 1998. IPv6 address architecture, in particular the link-local address, is described in "IP Version 6 Addressing Architecture", IETF RFC 2373, July 1998.

Two types of address autoconfiguration are supported in IPv6: stateless and stateful. These are described below.

In stateless address autoconfiguration, a unique interface identifier is created or selected for a node, either as a random 64-bit number or as a function of some static parameter like the hardware address of the interface. The node then carries out a neighbour discovery procedure referred to as "duplicate detection". This is to ensure that no other node in the same subnet is using the same 64-bit interface identifier. The first step in duplicate detection is to send a multicast packet, limited to the subnet, to a multicast destination address derived as a function of the interface identifier. The address is multicast to see if it elicits a response. If there is another node having that interface identifier, then it will respond. In this case another interface identifier is chosen and the procedure is repeated until a unique interface identifier is selected. If the interface identifier is unique to that subnet, no node having a duplicate interface identifier will respond and the node can then obtain a subnet prefix construct a full IPv6 address. Subnet prefixes are announced by routers as part of router advertisements or in response to router solicitations. According to "IPv6 Stateless Address Autoconfiguration", IETF RFC 2462, December 1998, if it is desired to avoid duplicate detection a control variable on the node DupAddrDetectTransmits is set to zero during the address assignment process so that duplicate detection does not occur.

In stateful autoconfiguration, the node requests its address from a DHCP server. Since the DHCP server keeps a record of assigned addresses, it is able to assign unique addresses. Therefore, duplicate detection is not strictly necessary although it may be present.

Mobile communication systems have been developed in order to reach users even when they are not close to a fixed telephone terminal. As the use of various data transmission services in offices has increased, different data services have also been introduced into mobile communication systems. Portable computers enable effective data processing wherever the user moves. Mobile communication networks in turn provide an effective access network to actual data networks for the user for mobile data transmission. Mobile data transmission is supported particularly well by digital mobile communication systems, such as the pan-European mobile communication system GSM (Global System for Mobile Communication).

It is becoming desirable for mobile terminals to be able to use the Internet. It has been proposed that the General Packet Radio Service (GPRS) be used to provide IP connectivity to mobile users.

GPRS is a new service in the GSM system, and is one of the objects of the standardization work of the GSM phase 2+ at ETSI (European Telecommunication Standard Institute). A GPRS network architecture is shown in FIG. 1. The GPRS operational environment comprises one or more subnetwork service areas, which are interconnected by a GPRS backbone network. A subnetwork comprises a number of packet data service nodes SN, which in this application will be referred to as serving GPRS support nodes SGSN, each of which is connected to the GSM mobile communication network (typically to base station systems) in such a way that it can provide a packet service for mobile data terminals via several base stations, that is cells. The intermediate mobile communication network provides packet-switched data transmission between a support node and mobile data terminals. Different subnetworks are in turn connected to an external data network, for example to a public switched data network PSPDN via GPRS gateway support nodes GGSN. The GPRS service can thus provide packet data transmission between mobile data terminals and external data networks when the GSM network functions as an access network.

In the GPRS system, layered protocol structures, known as a transmission level and a signalling level, have been defined for transmitting user information and signalling. A transmission level has a layered protocol structure providing transmission of user information together with control procedures of data transmission related to it (for example flow control, error detection, error correction and error recovery). A signalling level consists of protocols which are used for controlling and supporting the functions of the transmission level, such as controlling access to the GPRS network (Attach and Detach) and controlling the routing path of the established network connection in order to support the user's mobility. FIG. 2 illustrates the signalling level of the GPRS system between a mobile data terminal MS and an SGSN. The protocol layers of the transmission level are identical with those of FIG. 2 up to protocol layer SNDCP, above which there is a protocol of the GPRS backbone network (for example Internet Protocol IP) between the MS and the GGSN (instead of protocol L3MM). The protocol layers illustrated in FIG. 2 are:

Layer 3 Mobility Management (L3MM) supports the functionality of mobility management, for example GPRS Attach, GPRS Detach, security, routing update, location update, activation of a PDP context (each of which is numbered with a Network Layer Service Access Point Identifier (NSAPI)), and deactivation of a PDP context.

Subnetwork Dependent Convergence Protocol (SNDCP) supports transmission of protocol data units (N-PDU) of a network layer between an MS and an SGSN. The SNDCP layer, for example, manages ciphering and compression of N-PDUs.

Logical Link Control (LLC) layer provides a reliable logical link. The LLC is independent of the radio interface protocols mentioned below.

LLC Relay: This function relays LLC protocol data units (PDU) between an MS-BSS interface (Urn) and a BSS-SGSN interface (Gb).

Base Station Subsystem GPRS Protocol (BSSSGP): This layer transmits routing information and information related to QoS between a BSS and an SGSS.

Frame Relay, which is used over the Gb interface. A semipermanent connection for which several subscribers' LLC PDUs are multiplexed is established between the SGSN and the BSS.

Radio Link Control (RLC): This layer provides a reliable link independent of radio solutions.

Medium Access Control (MAC): This one controls access signalling (request and grant) related to a radio channel and mapping of LLC frames onto a physical GSM channel.

The function of the LLC layer can be described as follows: the LLC layer functions above the RLC layer in the reference architecture and establishes a logical link between the MS and its serving SGSN. With respect to the function of the LCC the most important requirements are a reliable management of LCC frame relay and support for point-to point and point-to-multipoint addressing.

The service access point (SAP) of the logical link layer is a point where the LLC layer provides services for the protocols of layer 3 (SNDCP layer in FIG. 2). The link of the LLC layer is identified with a data link connection identifier (DLCI), which is transmitted in the address field of each LLC frame. The DLCI consists of two elements: Service Access Point Identifier (SAPI) and Terminal End Point Identifier (TEI). The TEI identifies a GPRS subscriber and is usually a Temporary Logical Link Identity TLLI. The TEI can also be another subscriber identity, such as an international mobile subscriber identity IMSI, but usually transmission of the IMSI on the radio path is avoided. When a user attaches to a GPRS network, a logical link is established between the MS and the SGSN. Thus it can be said that the MS has a call in progress. This logical link has a route between the MS and the SGSN, indicated with the TLLI identifier. Thus the TLLI is a temporary identifier, the SGSN of which allocates for a certain logical link and IMSI. The SGSN sends the TLLI to the MS in connection with the establishment of a logical link, and it is used as an identifier in later signalling and data transmission over this logical link.

Data transmission over a logical link is carried out as explained in the following. The data to be transmitted to or from an MS is processed with an SNDCP function and transmitted to the LLC layer. The LLC layer inserts the data in the information field of LLC frames. The address field of a frame includes for example a TLLI. The LLC layer relays the data to the RLC, which deletes unnecessary information and segments the data into a form compatible with the MAC. The MAC layer activates radio resource processes in order to obtain a radio traffic path for transmission. A corresponding MAC unit on the other side of the radio traffic path receives the data and relays it upwards to the LLC layer. Finally, the data is transmitted from the LLC layer to the SNDCP, where the user data is restored completely and relayed to the next protocol layer. GPRS systems have been proposed which are based on IPv4. Such a system is typically based on mobile stations (MS) each comprising user terminal equipment (TE) and a mobile terminal (MT). The TE typically comprises a PPP client and communicates with a PPP server, in the MT, over PPPv4. In order for the TE to become functionally connected to the Internet, the PPP client typically requests an IPv4 address from the PPP server. On receiving this request, the MT starts a GPRS "Activate PDP Context" request without specifying a PDP address (if necessary, this will be preceded by a GPRS attach request). This causes a SGSN to send a "Create PDP Context" request to a GGSN, again with an empty PDP address field. The GGSN chooses an IPv4 address as the PDP address, and returns it in the "Create PDP Context Response" message to the SGSN, which sends it to MT in "Activate PDP Context Accept". The PPP server then sends this IPv4 address to the TE in a PPP configuration acknowledgement message.

GPRS systems have also been proposed which support IPv6. The protocol stacks involved in such a system are shown in FIG. 3. In common with the arrangement in IPv4, a GPRS mobile station typically comprises user terminal equipment (TE) and a mobile terminal (MT). In the case of providing IPv6 connectivity for GPRS mobile stations, the aim is to negotiate an IPv6 128-bit address between the TE and the GGSN. It should be noted that the TE may be a standard computer running a standard PC operating system. Equally, it may not be. The TE and the MT communicate using a point-to-point protocol such as PPPv6. The address acquisition procedure starts when a PPP client running in the TE initiates PPP set-up with a PPP server running on MT. An address negotiated between the PPP client and the PPP user is transferred to the GGSN/SGSN.

As mentioned above, in the case of IPv6, address negotiation involves duplicate detection being carried out. Therefore, for GPRS, this involves the sending of multicast packets over the air interface. Although this does not present a problem in conventional hardwired networks, in the case of GPRS and other radio systems, multicasting over the air interface is undesirable.

Although it has been proposed to set the DupAddrDetectTransmits variable to zero in conventional IPv6 hardwired networks in order to avoid duplicate detection occurring (see above), the GPRS system does not necessarily control the TE, and so it cannot be guaranteed that this will be an available option.

In addition to duplicate detection, other neighbour discovery procedures occur which are based on multicast packets. Either the GGSN or the TE IPv6 stack may send neighbour discovery messages in contexts other than duplicate detection, for example in trying to find the layer 2 (L2) address of another node in the same subnet in order to send a packet to it.

SUMMARY OF THE INVENTION

According to a first aspect of the invention there is provided a method of acquiring a network address in a communications network, the method comprising the steps of:

establishing an entity comprising information on network addresses within a sub-network;

creating a link with a link identifier unique within the subnetwork between a first node and a second node;

determining a network address for the first node on the basis of the link identifier;

checking by the entity whether the determined network address is unique; and accepting the network address if the determined network address is unique.

Preferably the link identifier is generated statically based on information identifying one of the nodes. Alternatively, it is generated randomly by one of the nodes.

Preferably the network address is derived from the link identifier and a network prefix. Preferably the network prefix is obtained by means of a router advertisement which is sent automatically between the first and the second nodes. Alternatively the network prefix is obtained by means of a router solicitation sent between the first and the second nodes. The router solicitation may be sent to a link-local address. Preferably there are a plurality of network prefixes. Preferably a plurality of network addresses are created for one or more nodes.

Preferably the first node is a mobile station. Preferably the second node is a gateway. It may be a GGSN. The entity may comprise one or both of the first and the second nodes.

Preferably, the information on network addresses comprised by the entity may be a list of link identifiers or network addresses in the subnetwork. In such an embodiment, the entity may comprise a gateway, for example a GGSN. In this case, the list may be contained within the gateway or may be accessible by the gateway. The list may comprise link identifiers which have previously been assigned to nodes or may comprise link identifiers which are unique and have not previously been assigned. In another embodiment, the entity is a mobile station. In this case, the information on network addresses may be that the mobile station has an identifier which can used to create a unique network address. This information may indicate, by implication, that other mobile stations have different identifiers which can be used to create different network addresses.

In an embodiment of the invention in which the entity is a gateway, uniqueness checking may be accomplished by the gateway referring to or selecting from the list of previously assigned link identifiers or network addresses or link identifiers. Preferably uniqueness checking is carried out by the gateway referring to a routing table. Alternatively the gateway may refer to a neighbour cache. Preferably the routing table or the neighbour cache is incorporated in the gateway. In another embodiment, uniqueness checking may be accomplished by the gateway referring to or selecting from a list of predetermined network addresses which have not yet been assigned. Alternatively, if the entity is a mobile terminal, uniqueness checking may be accomplished by the mobile terminal referring to the information on network addresses it contains and determining that it has a link identifier which can used to create a unique network address.

Preferably the link identifier is transferred between the first and the second nodes from a sender to a recipient.

The recipient may not check the uniqueness of the sent link identifier but may instead generate a different link identifier which is checked for uniqueness. If the link identifier is not unique, the recipient may itself choose a unique interface identifier which it sends to the sender.

Preferably the link is a dedicated path which connects the first node to the second node. The link may exclusively connect the first node and the second node. The link may be a context such as a PDP context.

Preferably the communications network comprises a plurality of subnetworks.

Preferably the communications network is a GPRS system. The communications network may be based on IPv6. In this case, the network address in an IPv6 address.

According to a second aspect of the invention there is provided a communications network comprising:

a subnetwork;

a first node and a second node;

an entity comprising information on network addresses within the subnetwork, the entity being able to create a link with a link identifier unique within the subnetwork between the first node and the second node and to determine a network address for the first node on the basis of the link identifier;

wherein the entity is able to check whether the determined network address is unique and to accept the network address if the determined network address is unique.

According to a third aspect of the invention there is provided a mobile terminal to operate with the communications network of the second aspect of the invention.

According to a fourth aspect of the invention there is provided a computer program product comprising a computer readable medium having thereon:

computer executable code means to establish an entity comprising information on network addresses within a sub-network;

computer executable code means to create a link with a link identifier unique within the subnetwork between a first node and a second node;

computer executable code means to determine a network address for the first node on the basis of the link identifier;

computer executable code means to enable the entity to check whether the determined network address is unique; and computer executable code means to accept the network address if the determined network address is unique.

According to a fifth aspect of the invention there is provided a method of a node acquiring an IP network address in a GPRS system, the method comprising the steps of:

the node sending a network address request to a gateway over a wireless link requesting a unique interface identifier;

the gateway receiving the request and determining a unique interface identifier;

the gateway confirming to the node that the interface identifier is unique;

the node adopting the interface identifier;

the gateway sending a network prefix to the node; and the node combining the interface identifier and the network prefix to produce the IP network address.

Preferably the node generates an interface identifier and sends it in the network address request. Preferably the gateway checks whether the sent interface identifier is unique.

According to a sixth aspect of the invention there is provided a method of a node acquiring an IP network address in a GPRS system, the method comprising the steps of:

the node sending a network address request to a gateway over a wireless link requesting for a unique interface identifier;

the gateway receiving the request;

the gateway sending a response to the node;

the node creating its own interface identifier;

the gateway sending a network prefix to the node; and the node combining the interface identifier and the network prefix to produce the IP network address.

Preferably the node chooses an interface identifier and sends it to the gateway together with the network address request. Alternatively, the node does not choose an interface identifier and sends the network address without such an identifier. Preferably the response sent by the gateway to the network address request does not include an interface identifier. The lack of an identifier may indicate to the node that it should choose its own interface identifier. The node may send the interface identifier it creates to the gateway for the gateway to determine if it is unique.

Preferably the network address request is a context activation request. Preferably the interface identifier is a PDP context. Preferably the interface identifier identifies the communications link of the node. It may identify terminal equipment connected to a mobile terminal, such as a computer. The terminal equipment may be at the end of a PPPv6 connection.

Preferably the method involves negotiation between the node and a PPP server. The PPP server may be located in a mobile terminal. The node and the mobile terminal may be separate units linked together. Alternatively they may comprise an integrated unit.

Preferably the gateway acts as a proxy and intercepts the request for a unique interface identifier or any other neighbour solicitation and then checks if the interface identifier is unique by referring to a routing table or neighbour cache that it maintains. Consequently the sending of multicast packets may be avoided.

According to a seventh aspect of the invention there is provided a communications system operating according to the method of the first, fifth or sixth aspects of the invention, comprising a communications network according to the second aspect of the invention or operable according to the computer program of the fourth aspect fo the invention.

Preferably it is a system that implements the context (tunnel) concept. It may be a GPRS system. It may be a third generation system such as UMTS or CDMA.

According to an eighth aspect of the invention there is provided a mobile terminal operating according to the method of the first, second or third aspects of the invention.

Preferably the mobile terminal is a GPRS mobile terminal. It may be used in a third generation system such as UMTS or CDMA.

According to a ninth aspect of the invention there is provided a method of a node acquiring an IP network address in a cellular telephone system, the method comprising the steps of:

the node sending a context request message containing information on which a unique interface identifier is to be based to a gateway over a wireless link;

the gateway receiving the context request message and determining the unique interface identifier;

the gateway sending to the node a context accept message containing at least one network prefix;

the node adopting the interface identifier; and the node combining the interface identifier and the network prefix to produce the IP network address.

BRIEF DESCRIPTION OF THE DRAWINGS

The invention will now be described, by way of example only, with reference to the accompanying drawings in which.

DETAILED DESCRIPTION

Figure 1:
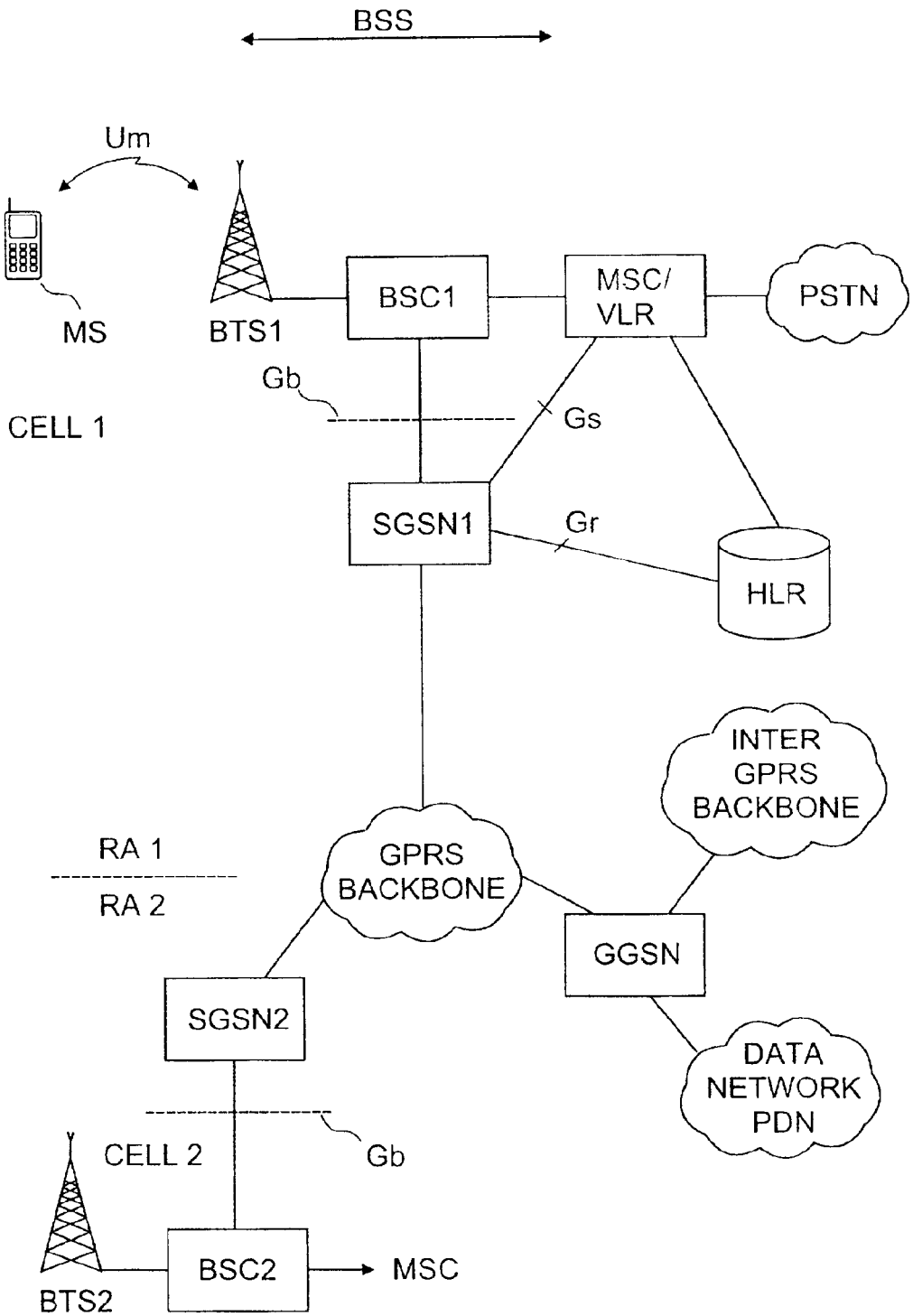
FIG. 1 shows a GPRS system.
Figure 2:
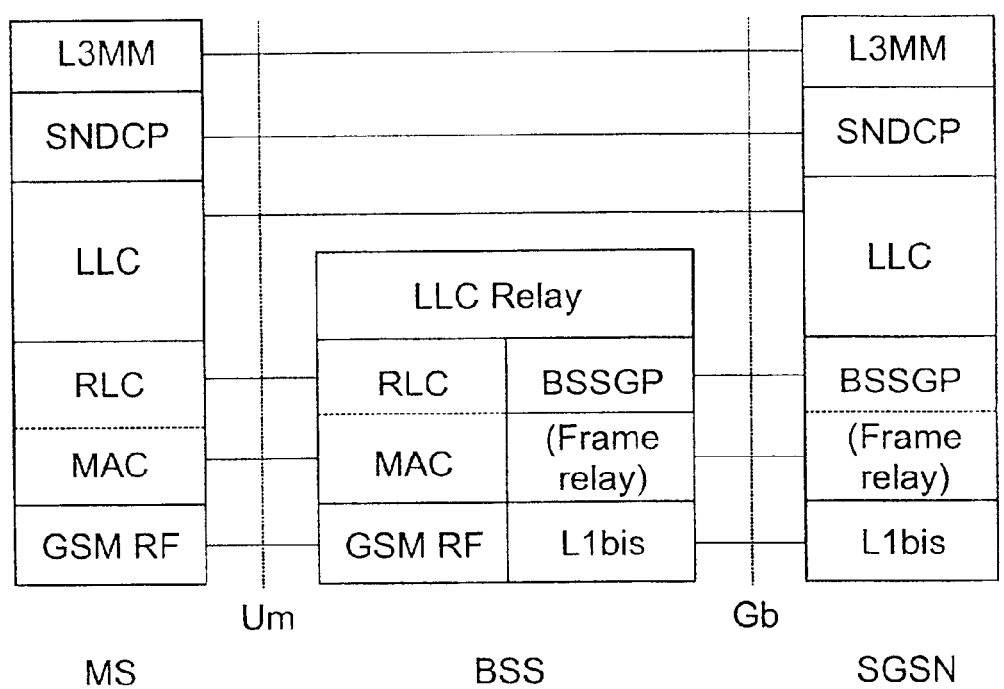
FIG. 2 shows protocol stacks involved in the system of FIG. 1.
Figure 3:
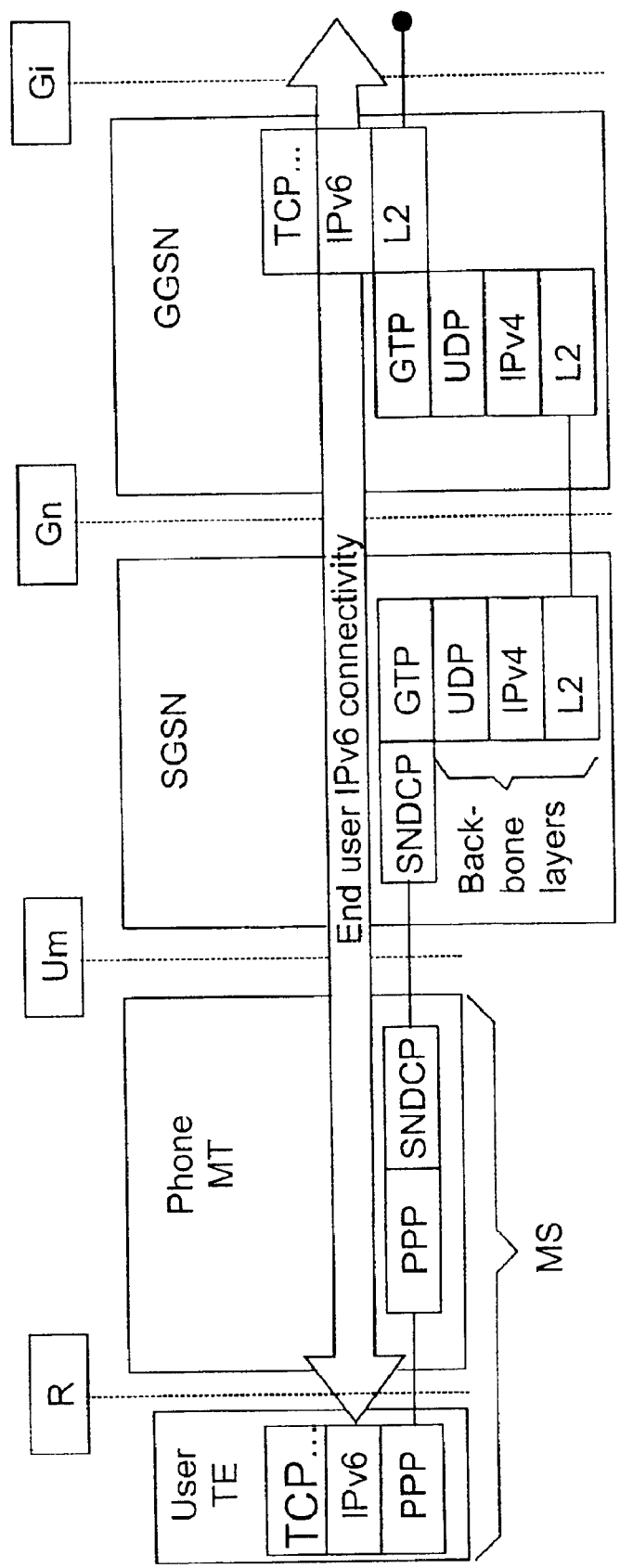
FIG. 3 shows another set of protocol stacks.

FIGS. 1 to 3 have been described above.

The invention is concerned with the acquisition of an address of a node in a subnet within a communications system operating according to IPv6.

A protocol according to the invention will now be described. A mobile station requires an IPv6 address. The mobile station either derives a PDP address (interface identifier) from statically configured information or generates it randomly. There are several potential sources of such statically configured information. It may be the IEEE EUI-64 identifier of its hardware interface (as specified in "IP Version 6 Addressing Architecture", IETF RFC 2373, July 1998) or the GPRS Tunnelling Protocol (GTP) tunnel ID (TID) based upon static information within the mobile station. Alternatively, the interface identifier may be derived from a combination of the NSAPI relating to a PDP context and a unique identifier of the mobile station, such as the international mobile subscriber identity (IMSI), the mobile station integrated services digital network (MSISDN) number or the international mobile station equipment identity (IMEI). By combining the NSAPI and a unique identifier of the mobile station, this means that a mobile station can have a number of separate interface identifiers. If the interface identifier is chosen deterministically from static information that is already known to both the mobile station and the GGSN, then it is not necessary to transfer this information during the address acquisition phase.

Randomly chosen interface identifiers are preferred because interface identifiers derived deterministically from static information will result in IPv6 addresses that are linkable. Since the source IPv6 address used by a mobile station may be visible to all of its correspondents and all routers en route, this may result in a loss of privacy. Although strong privacy may not be a concern for many mobile users, in certain circumstances it may be desired. Therefore, randomly generated interface identifiers may be obtained by using standard Access Point Names as a default mode of operation and deterministically derived interface identifiers may be obtained by using special Access Point Names. This is described below.

Once the mobile station has derived its interface identifier it sends an Activate PDP context request to a SGSN. If the interface identifier is chosen deterministically, the PDP address fields are left empty, and a special Access Point Name is used to identify the type of access sought by the user, in this case to inform the GGSN how it should derive the interface identifier. Furthermore, use of the special Access Point Name means that it is not necessary to transfer the interface identifier in protocol messages.

Depending on how the interface identifier has been generated, an Activate PDP context request is sent to a SGSN containing either the interface identifier or a Special Access Point name indicating how the interface identifier may be derived. The SGSN then sends a Create PDP context request to a GGSN. At the GGSN, the PDP address is either received or generated and it is then checked against a list of addresses held within the GGSN that have already been assigned. If it has not already been assigned, it is assigned in the GGSN for that mobile station. It should be noted that since the interface identifier is checked within the GGSN, it is not necessary to send it to other mobile stations to check if it is a unique address or if duplicate addresses exist. The GGSN responds to the PDP context request by sending a Create PDP context response containing the PDP address to the SGSN. The Create PDP context response is received by the SGSN and is then sent to the mobile station as an Activate PDP context Accept containing the PDP address. The mobile station receives the PDP address and adopts it as its interface identifier. The mobile terminal then receives a router advertisement from the GGSN containing a network prefix configured in the GGSN. The mobile station then combines the PDP address and the network prefix to create the IPv6 address. The GGSN creates a record of the mobile station's IPv6 address in a corresponding way and it includes an entry in its routing table indicating correspondence between this address and the PDP context so that messages can be sent to the correct mobile station. The router advertisement is either sent periodically by the GGSN or is sent in response to a specific request by the mobile station.

Before sending the PDP address to the GGSN, the SGSN may check it against a home location register (HLR) in compliance with UMTS 23.060. The reason for this is to check that the PDP address requested by the mobile station is indeed permitted for that mobile station. However, since the invention may have an independent uniqueness check of the PDP address, such a cross-check with the HLR may not be necessary.

A method according to the invention will now be described in greater detail with reference to FIG. 4 which uses a mobile station based on the arrangement of protocol stacks as shown in FIG. 3.

Figure 4:
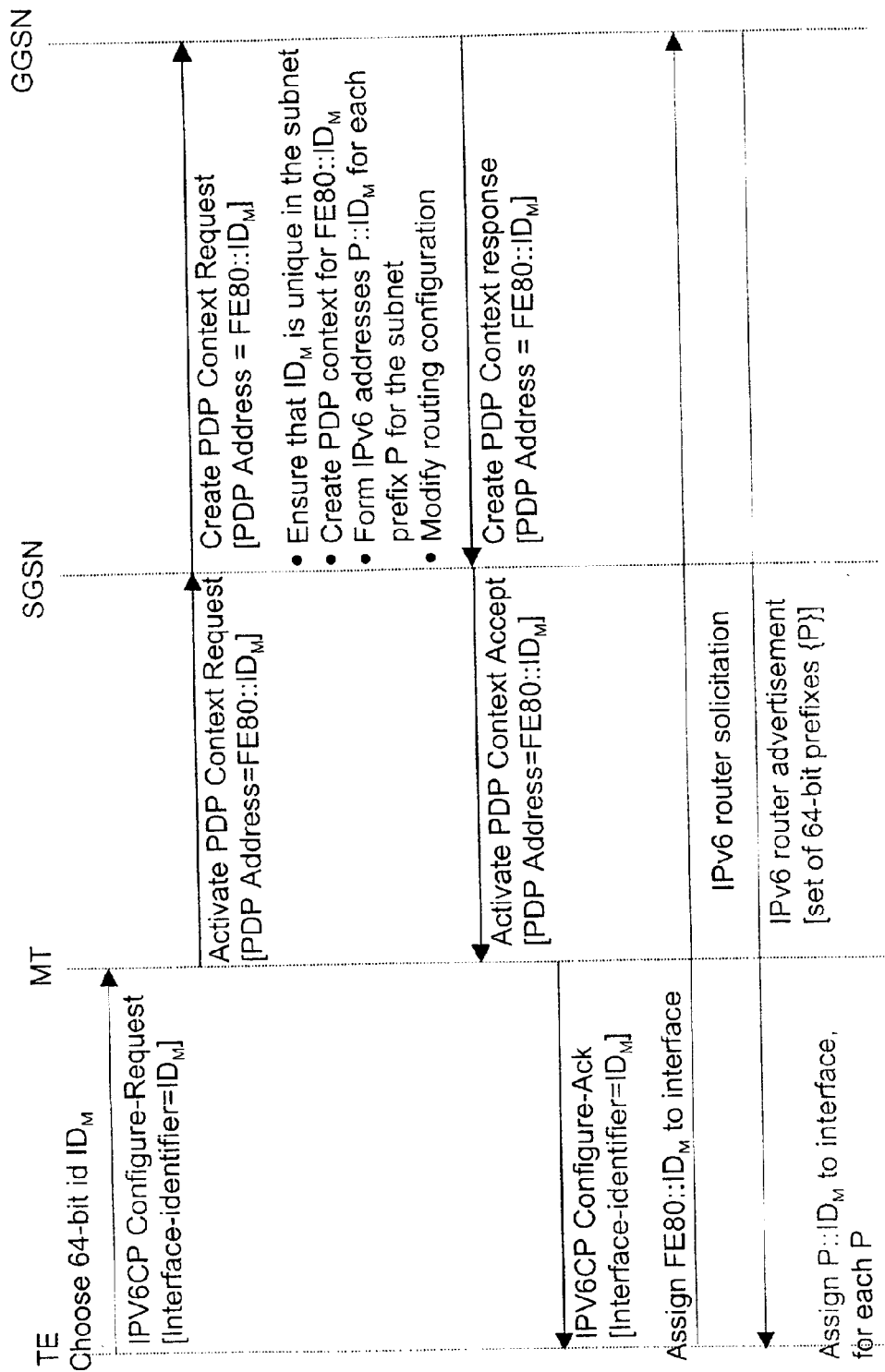
FIG. 4 shows an address acquisition method.

FIG. 4 describes a specific protocol for address acquisition which relates to a mobile station comprising a mobile terminal MT and terminal equipment TE. FIG. 4 shows the commands which pass between the TE, the MT, the SGSN and the GSGN. The GGSN acts as a router for an IPv6 subnet, in which it connects two or more subnets and forwards packets originating from one subnet to another subnet. A subnet is a group of nodes having a direct physical link. The same GGSN may act as a router for separate subnets. Mobile stations are assigned addresses that belong to this subnet.

The protocol will now be described with reference to FIGS. 3 and 4.

Step 1

The TE initiates an IPv6CP Configure-Request message with an Interface-Identifier option. The Interface-identifier option contains the 64-bit tentative interface identifier chosen by the TE. In this case, the interface identifier is determined randomly. However, it could be statically determined as mentioned above, in which case a special Access Point Name would be used.

Step 2

In this step, the protocol is PDP context activation in GPRS. The MT forms a link-local address by appending the interface identifier sent by the TE to the link-local prefix (FE80::/64). Although the link-local address is similar to any other IPv6 address, it can only be used in one link, that is within one subnet. The MT sends an "Activate PDP Context Request" to the SGSN with this link-local address in the PDP address field to activate a new PDP context in the GGSN. The SGSN relays the link-local identifier to the GGSN in an "Create PDP Context Request".

Step 3

The GGSN checks if the link-local address is unique for that subnet. To do this, the GGSN checks to see if this link-local address is already present in its list of PDP contexts which are stored in the HLR. If the GGSN determines that the link-local address is unique, the GGSN creates a GTP tunnel and PDP context corresponding to this link-local address. A tunnel is a means to carry one type of packet in another type, for example a IPv6 packet in a GTP packet. GPRS defines a single protocol (GTP) so that any type of data packet protocol can be carried over the same physical backbone network. The GGSN decides which IPv6 subnet the mobile station will be assigned to. Of course, if the GGSN is managing only one IPv6 subnet, then the mobile station will be assigned to this subnet. The GGSN also constructs all possible IPv6 addresses for the mobile station by combining each of the network prefixes for the chosen subnet or subnets with the interface identifier of the mobile station extracted from the link-local address of the mobile station. There may be a number of prefixes. Each prefix indicates one route for a packet sent by an external correspondent to reach this subnet. A subnet may have multiple prefixes so that nodes in that subnet have multiple ways of being addressed, each corresponding to a different route.

The GGSN makes appropriate local modifications, such as in its routing table, so that any packet passing through itself and into the subnet and destined for a particular node will be directed towards the correct GTP tunnel. The GGSN then sends a positive "Create PDP Context Response" to the SGSN which relays it to the MT in an "Activate PDP Context Accept" message.

In GPRS, all mobile nodes attached to the same GGSN can be put in the same subnet. Duplicate detection is prohibitively expensive. However, according to the invention, since the GGSN is involved in all address assignments, the GGSN is used to ensure that there are no duplicates. Thus, subnet multicast is avoided by the GGSN acting as a proxy, intercepting duplicate detection requests and replying to them in case of a duplicate. The GGSN can also intercept other kinds of neighbour solicitation.

Although PPPv6 RFC recommends that a PPP client need not perform duplicate address detection, this is not mandated. Therefore, the invention deals with the case in which a node may attempt duplicate detection. In any case, since nodes may try to carry out neighbour discovery, the invention also deals with these matters. In one embodiment, the GGSN acts as a proxy for neighbour discovery messages by intercepting all neighbour discovery messages (messages with a destination address matching the solicited-node multicast prefix FF02::1:FF00:0000/104 according to "IP version 6 Addressing Architecture", IETF RFC 2373), checking whether there is already an activated PDP context with target address in the message, and sending an appropriate reply. In another embodiment the GGSN intercepts neighbour discovery messages and sends them only to the intended recipients using unicast and not to the whole subnet.

Whether the GGSN IPv6 stack attempts to perform neighbour discovery for a mobile node depends on how it routes packets into the GTP tunnel. In the invention, two alternatives are proposed. In a first embodiment, each GTP tunnel has a separate entry in the routing table having a corresponding complete IPv6 address entry. Therefore the GGSN IPv6 stack does not attempt to perform neighbour discovery for a mobile node when there is an incoming packet destined for the mobile node because the GGSN is able to refer to its routing table to determine if such a node exists. In a second embodiment, the routing table does not contain this information and so forwarding code in the IPv6 stack checks its neighbour cache to see if an entry for the destination address already exists. If no such entry exists, then the IPv6 stack performs neighbour discovery. In the invention, it is preferred to prevent GGSN initiated neighbour discovery messages over the wireless interface by inserting entries in the neighbour cache whenever a PDP context is activated and remove them when it is deactivated. These entries are provided with sufficiently long lifetimes so that they do not expire while the PDP context is still active.

Step 4

The MT replies with an IPV6CP Configure-Ack with an Interface-identifier option containing the same 64-bit identifier as in step 1.

Step 5

The TE generates the link-local address from this interface identifier and assigns it to the interface. It then sends an IPv6 router solicitation message over this interface. In another embodiment the router advertisement is automatically sent directly after the PDP Context is created.

Step 6

The GGSN replies with an IPv6 router advertisement message which lists all of its network prefixes for the chosen subnet. The TE forms its IPv6 addresses by appending the interface identifier to these network prefixes, and assigns the resulting addresses to the same interface.

If the GGSN determines that the link-local address is not unique, it rejects the "Create PDP Context Request". In this case, the MT re-sends the "Activate PDP Context Request" with an empty PDP address field. The GGSN now chooses an IPv6 address and returns it with the "Created PDP Context Response". This causes the MT to reply with an IPv6CP Configure-Nack in Step 4, with an interface identifier option containing the 64-bit identifier extracted from the address chosen by the GGSN. The TE then re-sends an IPv6CP Configure Request message with this 64-bit identifier which can be accepted locally by the PPPv6 server on the MT without involving the GGSN.

If the interface identifier is statically determined, the MT can use this information to send the correct PPPv6 response to the TE. The GGSN can use the same information to make local configuration changes (so that incoming packets are routed correctly to the TE).

Variants of the protocol exist which will now be described. In these variants, many features of the preceding protocol remain the same, for example the way in which the GGSN handles the link-local address and changes its routing table or neighbour cache (described in step 3).

In a first variant, the mobile station generates a PDP address (interface identifier) in one of the ways described above and it is sent to the SGSN in an Activate PDP context request. However, in this variant, the GGSN has a local policy that the interface identifier must be chosen by that GGSN. This is because the particular GGSN may be operated by a different operator. Therefore the GGSN does not use a PDP address generated by the mobile station and so when the GGSN receives such a PDP address, it generates a replacement PDP address. In this way the GGSN can readily check that its self-generated replacement PDP address is unique. In fact, this can be the basis on which the replacement PDP address is chosen by the GGSN. Therefore, this replacement PDP address is assigned in the GGSN for that mobile station. The GGSN responds to the PDP context request by sending a Create PDP context response containing the replacement PDP address to the SGSN. The Create PDP context response is received by the SGSN and is then sent to the mobile station as an Activate PDP context Accept containing the replacement PDP address. The mobile station receives the replacement PDP address and adopts it as its interface identifier. The mobile terminal then receives a router advertisement from the GGSN as described above and creates the IPv6 address.

In an embodiment of the invention in which the first variant is used with the arrangement of FIG. 3, the address acquisition protocol described above in relation to FIG. 4 is modified. The resulting protocol is described with reference to FIG. 5.

In a second variant, the mobile station does not generate a PDP address (interface identifier), but simply sends an Activate PDP context request which does not contain a PDP address to a SGSN. The SGSN then sends a Create PDP context request to a GGSN. At the GGSN, no PDP address is received and so the GBSN can readily generate a unique PDP address and assign it in the GGSN for that mobile station. Since the Activate PDP context request does not contain a PDP address, there is not need to carry out a check against a HLR. The GGSN responds to the PDP context request by sending a Create PDP context response containing the unique PDP address to the SGSN. The Create PDP context response is received by the SGSN and is then sent to the mobile station as an Activate PDP context Accept containing the unique PDP address. The mobile station receives the PDP address and adopts it as its link-local address. The mobile terminal then receives a router advertisement from the GGSN as described above and creates the IPv6 address.

A third variant is similar to the second variant in that the mobile station does not initially generate a PDP address (interface identifier) and so it sends an "empty" Activate PDP context request. However, rather than the GGSN generating a unique PDP address, the GGSN does not do this and simply responds to the "empty" PDP context request by sending an "empty" Create PDP context response. The "empty" Create PDP context response is received by the SGSN and is then sent to the mobile station as an "empty" Activate PDP context Accept. The mobile station receives the "empty" Activate PDP context Accept and generates its own PDP address (interface identifier) by one of the two methods described above. The interface identifier may then be checked for uniqueness. Assuming that the interface identifier is unique, the mobile station adopts this PDP address as its interface identifier. The mobile station then receives a router advertisement from the GGSN as described above and creates the IPv6 address.

The preceding embodiments and variants are stateless address autoconfiguration in that a part of the mobile station generates its own address, that is the interface identifier.

However, in an embodiment of a mobile station comprising an MT and TE, even though the TE may generate an interface identifier and send it to the MT, the MT may discard it since it knows that it should not be sent. In effect, in such an embodiment, the IPv6 stack of the TE (or in other embodiments whichever part chooses the interface identifier), believes that it chooses the interface identifier.

If the system has stateful address autoconfiguration, then the procedure operates differently. In this case, the TE initially does not necessarily know that this is the case since the autoconfiguration is controlled at the GGSN. On receiving the Create PDP Context Request, the GGSN does not ensure that the PDP address $ID_M$ is unique because the real PDP address $ID_M$ will be chosen later as a consequence of a DHCP request. The GGSN sends a Create PDP Context Response back to the SGSN which sends an Activate PDP Context Accept to the MT. The MT-sends an IPv6CP Configure Ack to the TE. At this point, the TE is unaware that there needs to be a DHCP request and so it assigns FE80::$ID_M$ to the interface. In common with the earlier procedure, the TE then sends an IPv6 router solicitation to the GGSN. The GGSN responds by sending an IPv6 router advertisement back to the TE link-local address. However, the router advertisement has the M flag field set which indicates to the TE that it needs to obtain its address from a DHCP server. Therefore, the TE sends a DHCP request over IPv6 to the GGSN and the DHCP server forms a complete IPv6 address or as many IPv6 addresses as are required, and the GGSN modifies its routing configuration. The IPv6 address is sent to the mobile station (DHCP over IPv6).

It should be noted that in this embodiment, the DHCP server is part of the GGSN. In this case the DHCP server is controlled so that when there is a request for a PDP context address, the DHCP server generates a complete IPv6 address or complete IPv6 addresses and then modifies its routing table so that the chosen complete IPv6 address or addresses are mapped onto the corresponding GTP tunnel. Alternatively, the GGSN controls and modifies its neighbour cache.

Although it is not strictly necessary to have neighbour discovery if a DHCP server is used, it may be preferred to include it because TEs may connect to the GPRS system and may send requests for neighbour discovery.

Figure 5:
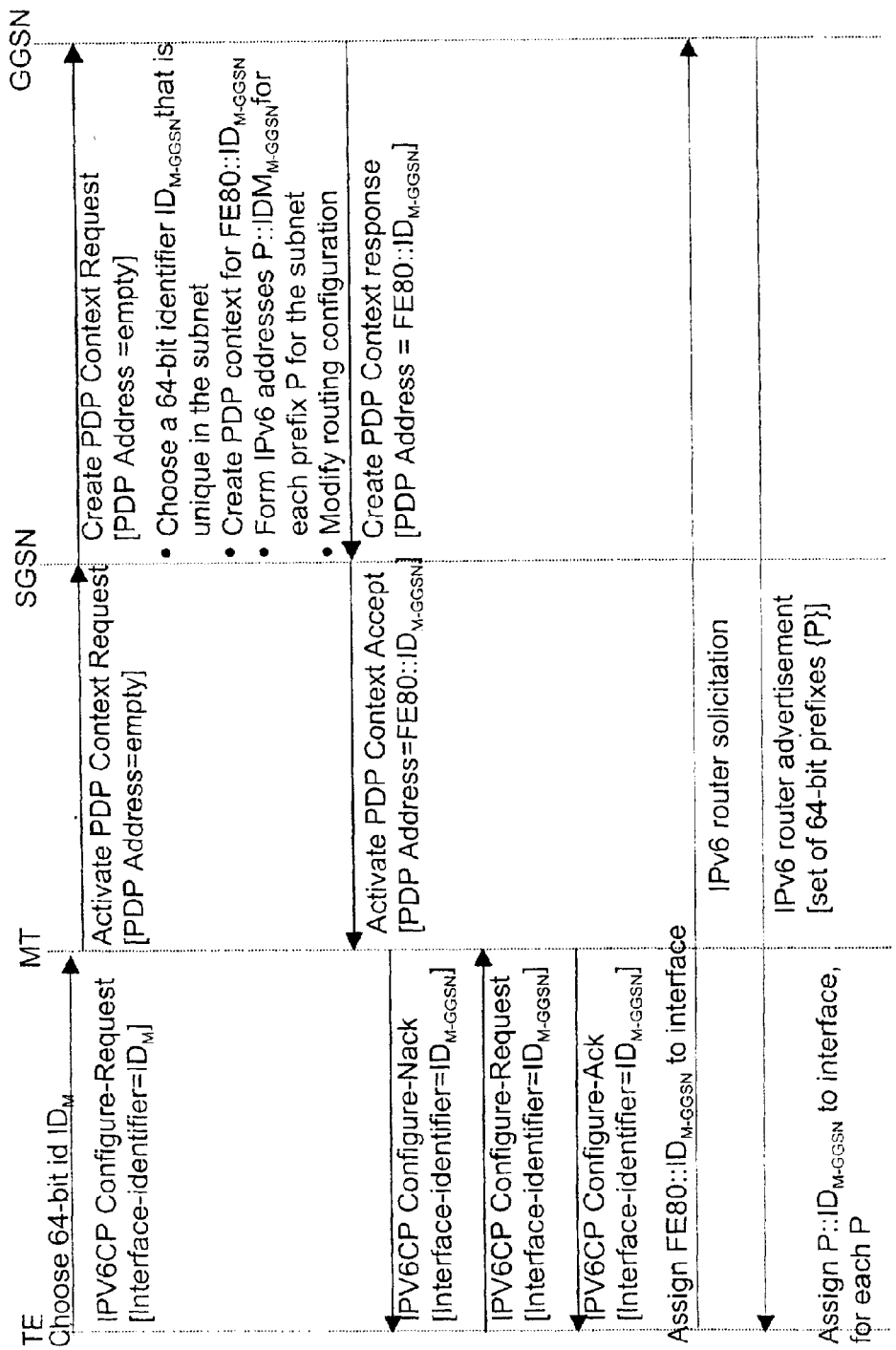
FIG. 5 shows another address acquisition method.
Figure 6:
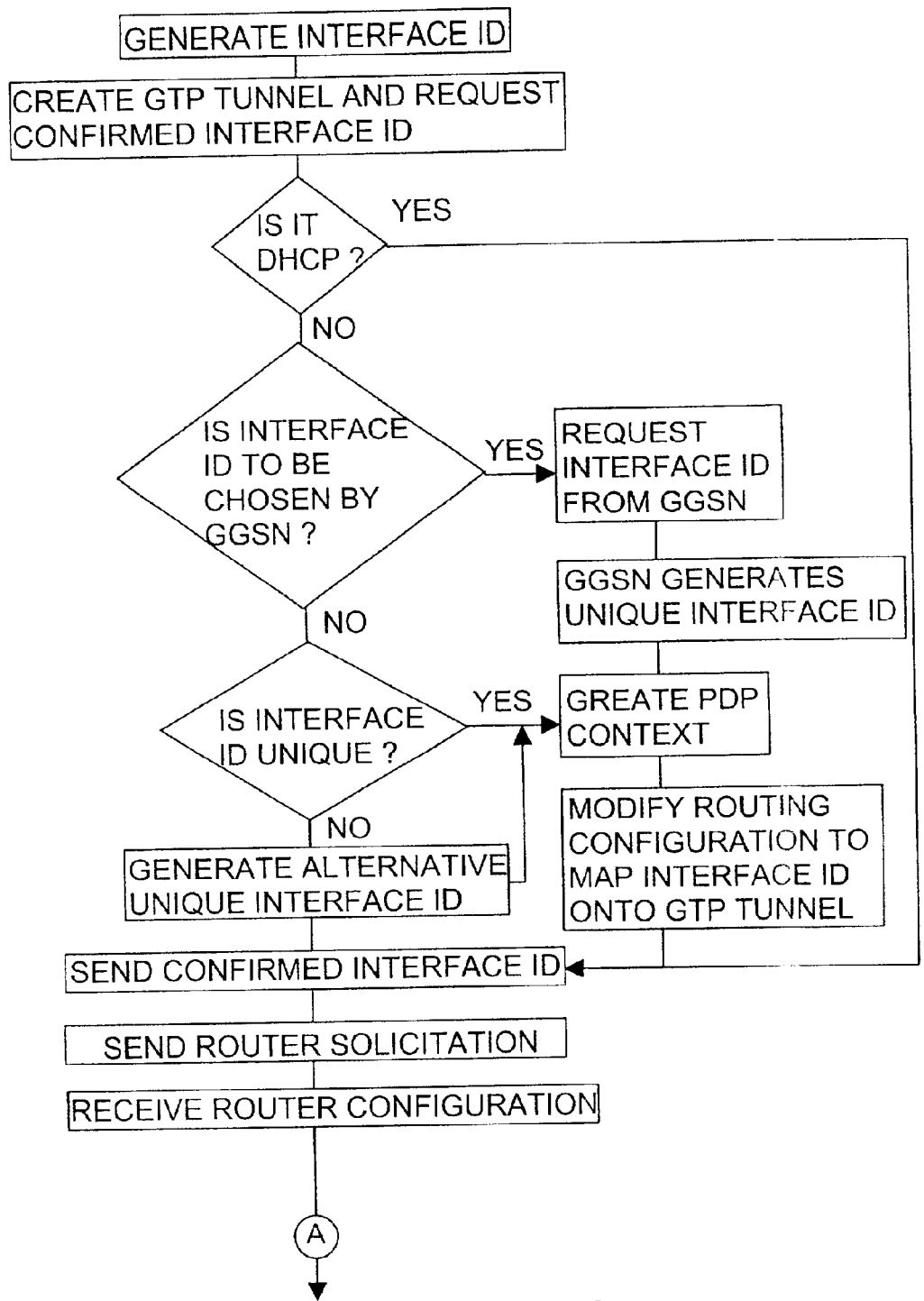
FIG. 6 shows a flowchart showing the operations of the methods of FIGS. 4 and 5.
Figure 6:
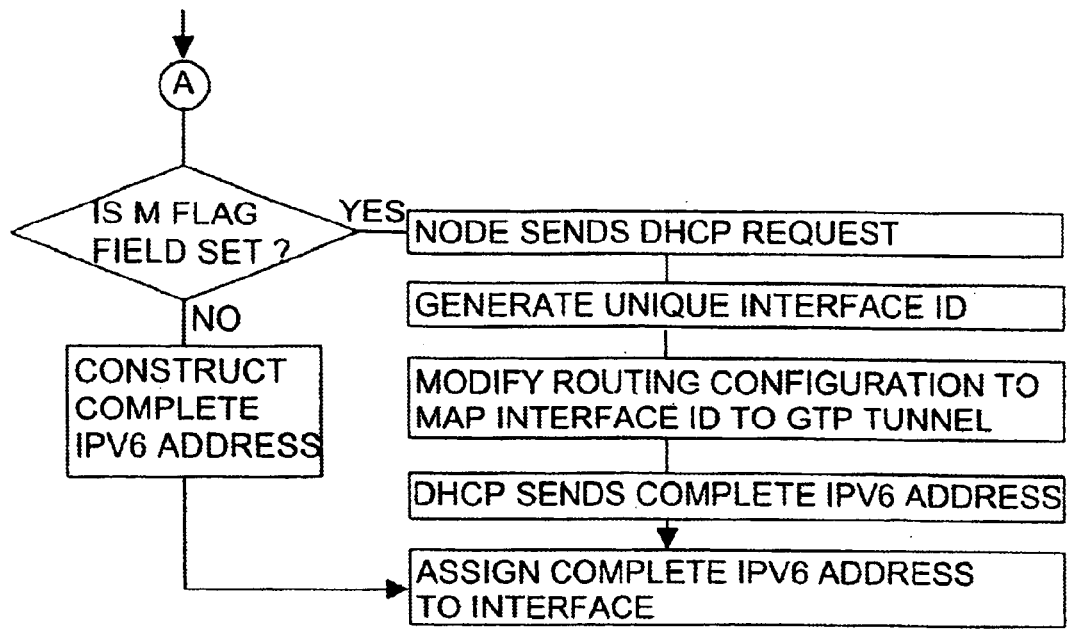

The procedures of FIGS. 4 and 5 are shown in the form of a flowchart in FIG. 6.

Figure 7:
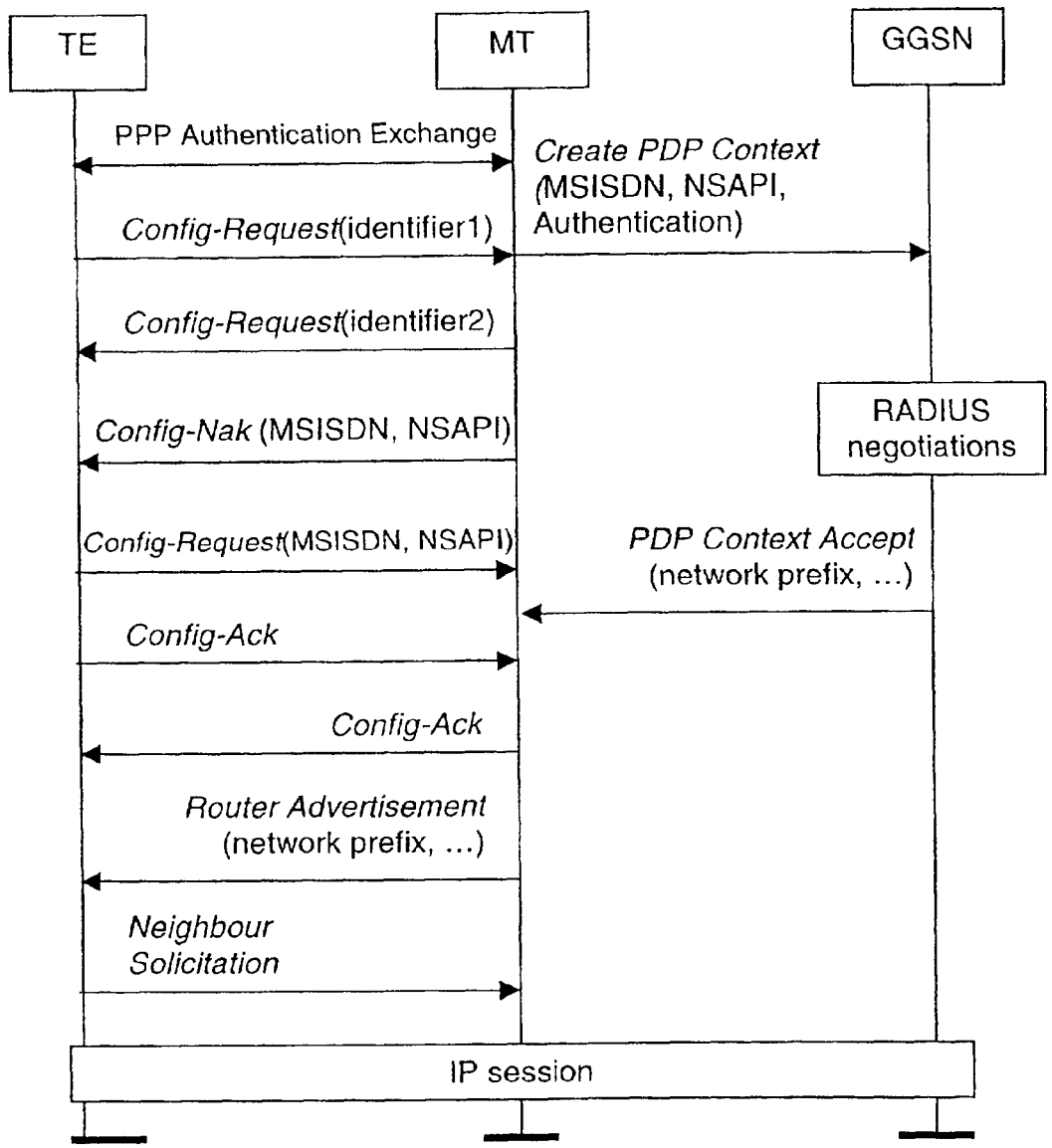
FIG. 7 shows an address acquisition method according to another embodiment of the invention.

In another embodiment of the invention certain "router" functions can be implemented in the mobile terminal (MT). This embodiment reduces the number of signals or commands over the air interface so that there is only one bidirectional handshake. A method according to this implementation of the invention is shown in FIG. 7.

In common with previous embodiments, a globally unique interface identifier is formed from one of the three unique numbers the IMEI, the IMSI or the MSISDN, and the NSAPI.

The interface identifier will be transmitted over the air interface and so use of the MSISDN is preferred since it is generally known. The IMEI and the IMSI are not generally known outside the GPRS system. An additional advantage of using the MSISDN is that the GGSN can convert it to the GTP TID (which is a concatenation of IMSI and NSAPI) without the need for extra signalling. The GGSN knows the IMSI and the MSISDN from other signals but not the IMEI. The SSGN knows all three.

The interface identifier will be transmitted over the air interface and so use of the MSISDN is preferred since it is generally known. The IMEI and the IMSI are not generally known. An additional advantage of using the MSISDN is that a combination of the MSISDN and the NSAPI is already used within the GPRS system as the GTP TID, and is therefore available to the SGSN and the GGSN without the need for extra signalling. The GGSN knows the MSISDN from other signals but not the IMEI. The SSGN knows both the MSISDN and the IMEI.

The MSISDN is a 15 digit denary number. The interface identifier can be coded in 64-bits as: 0 . . . 1: 00 (for future use), 2 . . . 5: NSAPI, 6 . . . 7: 10 ("globally unique" "single node" address), 8 . . . 9: 00 (for future use) and 10.63: MSISDN (in binary format). Bits 6 and 7 are "special" bits, which are used to indicate whether the address is globally unique (bit 6 =1) and whether it belongs to a single node (bit 7=0). This coding scheme provides room for longer MSISDN and NSAPI fields in the future. It should be noted that the PPP client in the TE does not need to perform duplicate address detection, since the "globally unique" bit 6 should indicate that this is not necessary.

Referring now specifically to FIG. 7, PPP address negotiation only takes place between the TE and the MT and so there is no need for messages concerned with this matter to be sent over the air interface. Messages are sent over the air interface for context activation, that is Create PDP Context and PDP Context Accept. The MSISDN and the NSAPI information can be sent in the Create PDP Context message. The network prefix (or a list of network prefixes) can be embedded as an option in the PDP Context Accept message.

Radius negotiations for the purpose of authentication take place between transmission of the Create PDP Context and the PCP Context Accept messages. Once the context has been activated, the IP pipe is open.

Timing of the messages is not strict, and the only causal dependency present is that a router advertisement has to wait until the PDP context has been accepted and a PDP Context Accept message received, so that the router advertisement can receive the necessary configuration parameters, for example router configuration and home agent for mobile IP. The router advertisement may actually be contained within the PDP Context Accept message. The GGSN generates the IPv6 address from the network prefix and the MSISDN and the NSAPI information in the same way as does the TE. Therefore, it is even possible that the GGSN can use the final IPv6 address in authentication messages before the TE has configured it to its own interface.

In the handshake over the radio interface, the same options are used as for IPv4 set-up for GPRS.

In this embodiment of the invention, since the neighbour discovery (neighbour solicitation) messages are not required, the MT can silently discard them if they use a link-local address and so they do not need be sent over the radio interface from the MT to the GGSN.

Since the NSAPI appears in each interface identifier, a single MT can support several independent IP sessions simultaneously with each session using one NSAPI. If the MT has several connectors, one per IP address, the NSAPI represents the address of the connector. Therefore, several devices can use the same MT at the same time (one NSAPI per connector).

In order to carry out push services, it is necessary to know the destination address for a particular push service. When the destination address is generated using the MSISDN, it is predictable, which means that a PDP context may be opened from the Internet side (NRPCA). However, since the NSAPI is not predictable by default, two ways are provided to implement a push service:

(i) Use a standard NSAPI value for push services. In this case the MT is the real target for the push services. If there are several devices connected to the MT, only the one that corresponds to the standard NSAPI value will receive push services.

(ii) Use a non-zero value for the unused bits in the interface identifier (see above). In this case it is up to the MT configuration to decide which device receives the push services. The configuration is set when a push service is subscribed to. In this alternative the GGSN still has to use a real NSAPI value to map the IPv6 address to a GTP tunnel. The default NSAPI and use of the bits are made to correspond.

In both cases the user can open a real PDP context from the MT side. The GGSN should not open a PDP context for any packet that arrives at the access point from the Internet side. It is better to send a notification to the MT, and let it decide if it wants to initiate the context to receive the packet.

An important aspect of this embodiment of the invention is that the MT emulates a router and carries out the following functions:

(i) It sends a router solicitation based on the network prefix it gets from the GGSN/AP.

(ii) It drops neighbour solicitations if they use a link-local address.

(iii) It responds to link-local router solicitations with a router advertisement.

This embodiment of the invention enables standard PPP implementation to be used in the TE and so there is no need to manipulate its counters.

Figure 8:
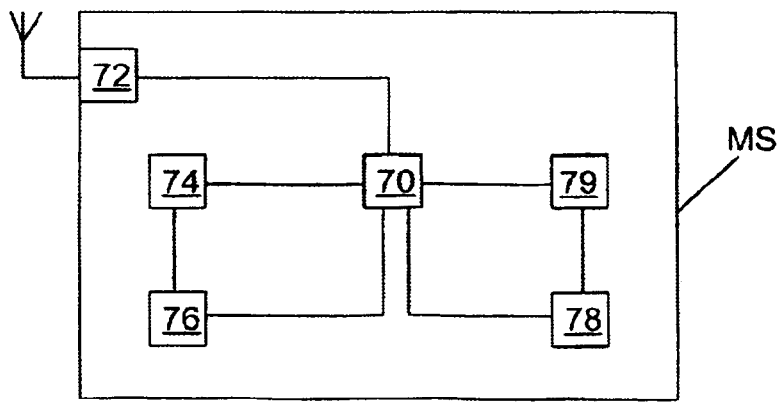
FIG. 8 shows a mobile terminal.

FIG. 8 shows an embodiment of a mobile station MS for use in the GPRS system of FIG. 1 and the preceding embodiments and methods. The mobile station MS comprises a central processing unit (CPU) 70, a transceiver 72, a memory 74 for storing GPRS-related information of the mobile station, a protocol stack 76 to control communication with the GPRS system, a display 78 and a memory 79 for telephony-related functions of the mobile station. The operation of the transceiver 72 in making telephone calls is not described since this relates to conventional telephony activity of the mobile station MS. The CPU 70 controls the operation of the other elements.

The methods described above can apply to a mobile station which does not comprise terminal equipment and a mobile terminal, but simply comprises an integrated unit. In this embodiment, PPPv6 does not need to be employed within the mobile station.

The invention is not restricted to the use of PPPv6. Other point-to-point protocols exist such as SLIP (serial line IP). IPv4 nodes in local area networks use other layer 2 (L2) protocols such as "ethernet" or "token ring". Furthermore, as mentioned above, in certain embodiments, a point-to-point protocol is not required if an integrated mobile station is used which does not have a separate MT and TE.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

What is claimed is:

1. A method of acquiring a network address in a communications network, the method comprising the steps of:

establishing an entity comprising information on network addresses within a subnetwork;

sending a network address request from a first node to a second node without an interface identifier;

creating a link with a link identifier unique within the subnetwork between the first node and the second node;

determining a network address for the first node on the basis of the link identifier;

checking by the entity whether the determined network address is unique; and accepting the network address if the determined network address is unique.

2. A method according to claim 1 in which the link identifier is generated statically based on information identifying one of the nodes.

3. A method according to claim 1 in which the link identifier is generated randomly by one of the nodes.

4. A method according to claim 1 in which the information on network addresses is a list of link identifiers or network addresses in the subnetwork.

5. A method according to claim 4 in which the list comprises link identifiers which have previously been assigned to nodes.

6. A method according to claim 5 in which uniqueness checking is accomplished by the entity referring to the list of previously assigned link identifiers or network addresses.

7. A method according to claim 6 in which uniqueness checking is carried out by the entity referring to a routing table.

8. A method according to claim 6 in which uniqueness checking is carried out by the entity referring to a neighbor cache.

9. A method according to claim 4 in which the list comprises link identifiers which are unique and has not previously been assigned.

10. A method according to claim 9 in which uniqueness checking is accomplished by the gateway selecting a link identifier or a network address from the list of link identifiers or network addresses which have not yet been assigned.

11. A method according to claim 1 in which the information is that the entity has an identifier which is useable to create a unique network address.

12. A method according to claim 11 in which uniqueness checking is accomplished by the entity referring to the information on network addresses it contains and determining that it has a link identifier which is useable to create a unique network address.

13. A method according to claim 1 in which the link identifier is transferred between the first and the second nodes from a sender to a recipient.

14. A method according to claim 13 in which the recipient of the link identifier discards it and generates a different link identifier which is checked for uniqueness.

15. A method according to claim 13 in which if the link identifier is not unique, the recipient chooses a unique link identifier which it sends to the sender.

16. A method according to claim 1 in which the network address is derived from the link identifier and a network prefix.

17. A method according to claim 16 in which the network prefix is obtained by means of a router solicitation sent between the first and second nodes.

18. A method according to claim 16 in which the network prefix is obtained by means of a router advertisement which is sent automatically between the first and the second node.

19. A method according to claim 16 in which there are a plurality of network prefixes used to create a plurality of network addresses for a node.

20. A method according to claim 1 in which the communications network comprises a plurality of subnetworks.

21. A method according to claim 1 in which the first node is a mobile station.

22. A method according to claim 1 in which the second node is a gateway.

23. A method according to claim 1 in which the communications network is a GPRS system.

24. A method according to claim 1 in which the link is a PDP context.

25. A method according to claim 1 in which the network address is a IPv6 address.

26. A communications network comprising:
- a subnetwork;
- a first node and a second node, the first node being able to send a network address request to the second node without an interface identifier;
- an entity comprising information on network addresses within the subnetwork, the entity being able to create a link with a link identifier unique within the subnetwork between the first node and the second node and to determine a network address for the first node on the basis of the link identifier;
- wherein the entity is able to check whether the determined network address is unique and to accept the network address if the determined network address is unique.

27. A mobile terminal to operate with the communications network of claim 26.

28. A method according to claim 1 in which the communications network is a mobile station.

29. A method according to claim 1 in which the link is a mobile packet data connection.

30. A mobile terminal to operate with a communications network, the communications network comprising:
- a subnetwork;
- a node;
- an entity comprising information on network addresses within the subnetwork, the entity being able to create a link with a link identifier unique within the subnetwork between the mobile terminal and the node and to determine a network address for the mobile terminal on the basis of the link identifier, and the entity being able to check whether the determined network address is unique and to accept the network address if the determined network address is unique; and
- wherein the mobile terminal is able to send a network address request to the node without the interface identifier.

31. A network element adapted to operate in a communications network, the communications network comprising:
- a subnetwork;
- a node;
- the network element being associated with an entity comprising information on network addresses within the subnetwork, the entity being able to create a link with a link identifier unique within the subnetwork between the node and the network element and to determine a network address for the node on the basis of the link identifier, and the network element being able to receive a network address request from the node without the interface identifier; and
- wherein the entity is able to check whether the determined network address is unique and to accept the network address if the determined network address is unique.

32. A network element according to claim 31 in which the network element is a gateway.

33. A network element according to claim 31 in which the network element comprises the entity.

34. A method of a node acquiring an IP network address in a communications system, the method comprising the steps of:
- the node sending a network address request to a gateway over a wireless link requesting a unique interface identifier wherein the network address request does not contain an interface identifier;
- the node receiving from the gateway a unique interface identifier;
- the node adopting the interface identifier;
- the node receiving a network prefix from the gateway; and
- the node combining the interface identifier and the network prefix to produce the IP network address.

35. A method of a gateway assigning an IP network address in a communications system, the method comprising the steps of:
- the gateway receiving a network address request from a node over a wireless link requesting a unique interface identifier wherein the network address request does not contain an interface identifier;
- the gateway sending to the node a unique interface identifier for adoption by the node; and
- the gateway sending a network prefix to the node to enable the node to combine the interface identifier and the network prefix to produce the IP network address.

* * * * *